United States Patent
Carlson (10) Patent No.: US 11,218,110 B1
(45) Date of Patent: Jan. 4, 2022

(54) PROTECTED POWER SOURCE SYSTEM AND METHOD

(71) Applicant: SMART WAVE SOLAR, LLC, Bluffdale, UT (US)

(72) Inventor: Cameron M. Carlson, Eagle Mountain, UT (US)

(73) Assignee: Smart Wave Solar, LLC, Bluffdale, UT (US)

( * ) Notice: Subject to any disclaimer, the term of this patent is extended or adjusted under 35 U.S.C. 154(b) by 0 days.

(21) Appl. No.: 17/334,686

(22) Filed: May 28, 2021

(51) Int. Cl.
*H02S 40/32* (2014.01)
*H02S 40/38* (2014.01)
*H02S 40/36* (2014.01)
*H02S 50/10* (2014.01)
*H02H 7/20* (2006.01)

(52) U.S. Cl.
CPC ............. *H02S 40/32* (2014.12); *H02H 7/20* (2013.01); *H02S 40/36* (2014.12); *H02S 40/38* (2014.12); *H02S 50/10* (2014.12); *H02J 2300/22* (2020.01)

(58) Field of Classification Search
CPC .......... H02S 40/32; H02S 40/36; H02S 40/38; H02S 50/10; H02H 7/20; H02J 3/383; H02J 2300/22
See application file for complete search history.

(56) References Cited

U.S. PATENT DOCUMENTS

2011/0088741 A1* 4/2011 Dunton ................ H03K 17/687
136/244

OTHER PUBLICATIONS

Tigo PV Rapid Shutdown Summary Guide, Tigo Energy Inc., 2020, 1 page, https://www.tigoenergy.com/downloads, accessed Jul. 26, 2021.
Backup Interface for North America BI-EUSGN-01 / BI-NUSGN-01 Datasheet, Solaredge, Oct. 2020, 3 pages, V01, SolarEdge Technologies, Ltd.
Sunny Boy 3.0-US / 3.8-US / 5.0-US / 6.0-US / 7.0-US / 7.7-US Installation Manual, SMA Solar Technology Ag, Nov. 19, 2020, 75 pages, https://files.sma.de/downloads/SBxx-1SP-US-41-IA-xx_12.pdf, accessed Jul. 26, 2021.
Tigo TS4 Brochure, Tigo Energy Inc., 2021, 3 pages, https://www.tigoenergy.com/downloads, accessed Jul. 26, 2021.
APsmartTransmitter—PLC Datasheet, Mar. 27, 2021, 2 pages, APsmartGlobal.com.

(Continued)

*Primary Examiner* — Carlos Amaya
(74) *Attorney, Agent, or Firm* — Warren M. Pate; Pate Peterson, PLLC (57) ABSTRACT

A system for safely obtaining electrical power from a solar array in a grid-down situation is disclosed. The system may include an array of solar panels, an inverter, a rapid shutdown transmitter, a transformer, and a switch. First wiring may extend to electrically connect the array of solar panels to the inverter. The transformer may have an electrical input and an electrical output. The electrical input of the transformer may be connected to receive electrical power from at least one solar panel of the array of solar panels. Second wiring may extend to electrically connect the electrical output of the transformer to the rapid shutdown transmitter. The switch may control delivery of electrical power through the second wiring from the electrical output of the transformer to the rapid shutdown transmitter.

20 Claims, 7 Drawing Sheets

(56) References Cited

OTHER PUBLICATIONS

Tigo Installation Manual TS4-F, TS4-A-F, TS4-A-2F and Rss Transmitter, Tigo Energy, Inc., Apr. 27, 2021, 33 pages, https://www.tigoenergy.com/downloads, accessed Jul. 26, 2021.
APsmart RSD-D Datasheet, May 25, 2021, 3 pages, APsmartGlobal.com.

* cited by examiner

PROTECTED POWER SOURCE SYSTEM AND METHOD

BACKGROUND

1. Field of the Invention

This invention relates to solar power generation and, more particularly, to novel systems and methods for using solar power in grid-down situations.

2. Background Art

Solar arrays may be used or connected in various arrangements. For example, in an off-grid arrangement, a solar array may be connected to a charge controller and a battery bank. Alternatively, a solar array may be connected to a power grid in order to facilitate net energy metering (NEM), reduce the need for a battery bank, or the like. A solar array connected to a power grid may present certain safety issues in grid-down situations. Accordingly, what is needed are improved systems and methods for accessing the power generated by grid-connected solar arrays in grid-down situations.

BRIEF SUMMARY OF THE INVENTION

In view of the foregoing, in accordance with the invention as embodied and broadly described herein, a method and apparatus are disclosed in one embodiment of the present invention as including an array of solar panels, an inverter, a rapid shutdown transmitter, a transformer, and a switch. First wiring may extend to electrically connect the array of solar panels to the inverter. The transformer may have an electrical input and an electrical output. The electrical input of the transformer may be connected to receive electrical power from at least one solar panel of the array of solar panels. Second wiring may extend to electrically connect the electrical output of the transformer to the rapid shutdown transmitter. The switch may control delivery of electrical power through the second wiring from the electrical output of the transformer to the rapid shutdown transmitter.

In operation, the rapid shutdown transmitter may function as intended as part of a rapid shutdown system. Accordingly, when the grid goes down, the rapid shutdown system may cut off the flow of electricity from the array of solar panels to the inverter. However, the transformer and switch may enable a user to selected unlock or reset the rapid shutdown system and restart the flow of electricity from the array of solar panels to the inverter once the inverter is no longer connected to send AC power to the grid. Thus, the transformer and switch may enable a user to safely obtain AC power from the inverter in a grid-down situation.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF SELECTED EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Figure 1:
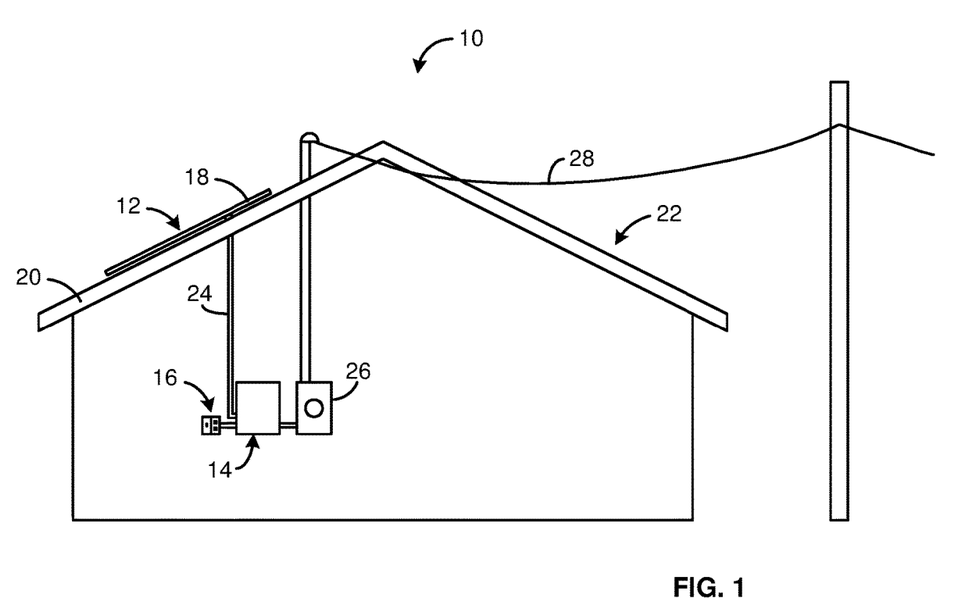
FIG. 1 is a schematic diagram of one embodiment of a grid-tied solar power generation system applied to a building in accordance with the present invention.

Referring to FIG. 1, in selected embodiments, a system 10 in accordance with the present invention may comprise a solar array 12, an inverter system 14, and a protected power system 16. A solar array 12 may comprise an arrangement of one or more solar panels 18. A solar array 12 may be positioned and secured so as to have an unobstructed view of the sun. For example, in the northern hemisphere, a solar array 12 may be secured to a south facing pitch of a roof 20 of a residence 22 or other building 22. In other locations or situations, other structures or arrangements may be used to secure a solar array 12.

One or more wires may extend to electrically connect a solar array 12 to an inverter system 14. In selected embodiments, conduit 24 may extend from a solar array 12 to an inverter system 14. One or more wires that electrically connect a solar array 12 to an inverter system 14 may pass through the conduit 24. Accordingly, the conduit 24 may protect the one or more wires.

An inverter system 14 may be electrically connected to grid power. For example, an inverter system 14 may be electrically connected to a meter 26 and/or main panel 26 that is connected to grid power via a power line 28. An inverter system 14 may include an inverter that converts directed current produced by the solar array 12 into alternating current. The alternating current may be consumed on-site (e.g., used by one or more electrical appliances or systems of a residence 22 or other building 22). Alternatively or in addition thereto, the alternating current may be fed into the grid where is may be used by other residences 22, buildings 22, or the like.

In selected embodiments, a home or building owner may interact with a utility company (e.g., a company that manages delivery of grid power to a home 22 or other building 22) via a net energy metering (NEM) arrangement. Accordingly, when a system 10 produces more electrical power than is immediately consumed on-site, that excess power may be fed into the grid and the home or building owner may be given credit for producing that power. For example, the home or building owner may be able to draw that amount of power from the grid at a future date without charge. Alternatively, a home or building owner may interact with a utility company via some other arrangement.

Figure 2:
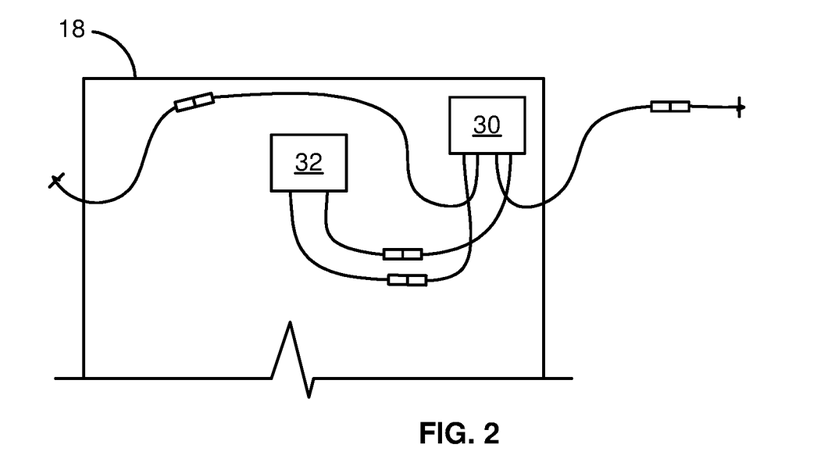
FIG. 2 is an illustration of one embodiment of a back side of a solar panel having a rapid shutdown module installed in accordance with the present invention.

Referring to FIG. 2, for safety reasons (e.g., to protect utility workers), it may be important to shut down a system 10 in accordance with the present invention whenever the grid connected thereto goes down (i.e., whenever the power line 28 stops delivering grid power to a corresponding home 22 or building 22). Accordingly, a system 10 may include a rapid shutdown system. A rapid shutdown system may electrically disconnect a solar array 12 from an inverter system 14 whenever there is a grid-down situation.

A rapid shutdown system may include a plurality of rapid shutdown modules 30. In selected embodiments, each solar panel 18 of a solar array 12 may have a rapid shutdown module 30 applied thereto. For example, a back of a solar panel 18 may have a junction box 32. Positive and negative electrical leads may extend from a junction box 32. A rapid shutdown module 30 may be applied to a back of a solar panel 18 proximate a junction box 32 thereof and electrically connect to the positive and negative leads extending from the junction box 32. A rapid shutdown module 30 may also be electrically connect to neighboring panels 18 (e.g., to the rapid shutdown modules 30 of neighboring panels 18). Accordingly, a rapid shutdown module 30 may be electrically connected so as to control whether electrical power leaves a solar panel 18 or is passed from one solar panel 18 to a neighboring solar panel 18.

Figure 3:
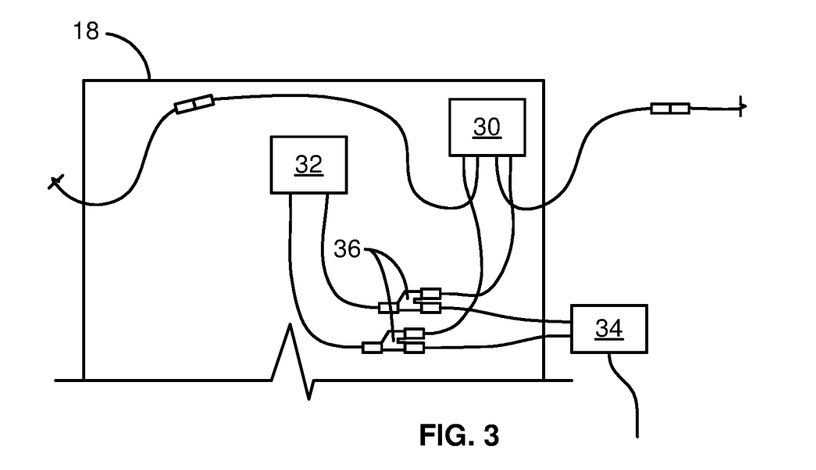
FIG. 3 is an illustration of one embodiment of a back side of a solar panel having a rapid shutdown module and transformer installed in accordance with the present invention.

Referring to FIG. 3, in a grid-down situation, at least some electrical power may be needed by a system 10 in order to perform certain functions. However, one or more laws and/or regulations may limit how much electrical power may be passed form a solar array 12 to an inverter system 14 in a grid-down situation. Such laws and/or regulations may set a maximum voltage. That maximum voltage may be below the voltage generated by a single solar panel 18 of a solar array 12. Accordingly, in selected embodiments, a system 10 may include a transformer 34.

A transformer 34 may connect to the positive and negative leads extending from a junction box 32 before those leads connect to a rapid shutdown module 30. For example, the positive and negative leads extending from the junction box 32 may engage respective splitters 36 (e.g., respective MC4 splitters) that enable both a rapid shutdown module 30 and a transformer 34 to receive electrical power output by the solar panel 18. However, because a transformer 34 may connect to the positive and negative leads extending from a junction box 32 before those leads connect to a rapid shutdown module 30, the transformer 34 may not be affected by the operation of a rapid shutdown system. That is, in a grid-down situation, a transformer 34 may still be able to receive electrical power from a corresponding solar panel 18 and pass that electrical power to an inverter system 14 so long as the electrical power passed to the inverter system 14 is below a desired, safe, or legal threshold.

For example, a solar panel 18 may be a 350 Watt panel with a max power voltage (VMPP) of about 35 Volts and an open circuit voltage (VOC) of about 41 Volts. A desired, safe, or legal threshold for how much electrical power may be passed form a solar array 12 to an inverter system 14 in a grid-down situation may be no more than about 15 Volts. Accordingly, in such a situation, a transformer 34 may receive electrical power output by the solar panel 18 at about 35 Volts and output electrical power at about 12 to 14 Volts. Accordingly, it may be both safe and legal to pass electrical power output by a transformer 34 to an inverter system 14 in a grid-down situation.

Figure 4:
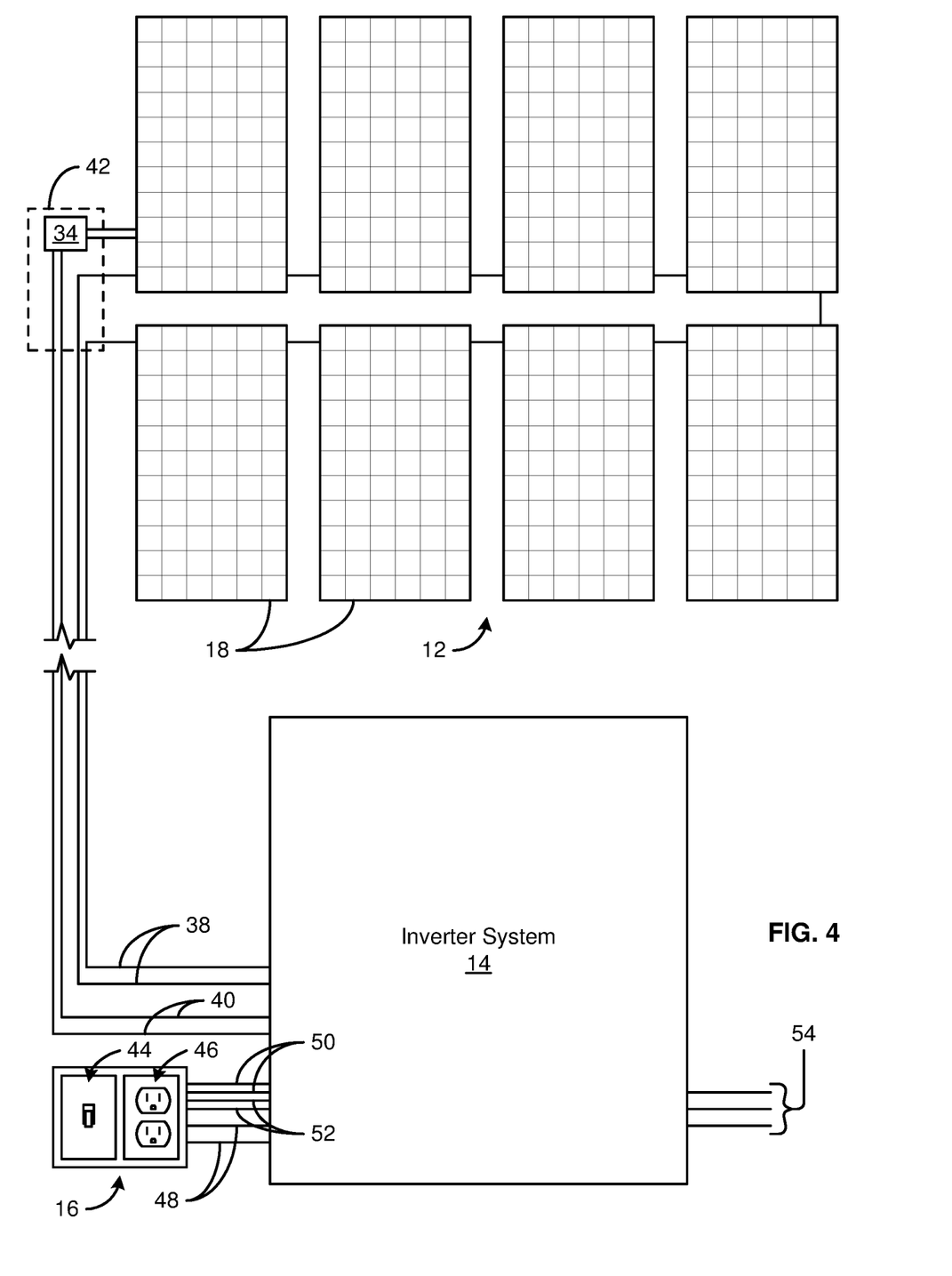
FIG. 4 is a schematic diagram of one embodiment of a grid-tied solar power generation system in accordance with the present invention.

Referring to FIG. 4, in selected embodiments, a solar array 12 may comprise a plurality of solar panels 18 connected together in a suitable (e.g., series, parallel, series-parallel, etc.) arrangement. For example, as shown in the illustrated arrangement, a solar array 12 may comprise a plurality of solar panels 18 connected in series. Accordingly, the voltage passed from the solar array 12 to an inverter system 14 through a first set of wires 38 may be a sum of the voltage output by the various solar panels 18 that form the solar array 12. Conversely, the voltage passed from a transformer 34 to an inverter system 14 through a second set of wires 40 may be much less and typically about 12-14 Volts. In selected embodiments, a transformer 34 and one or more electrical junctions or connections corresponding to the first and/or second set of wires 38, 40 may be housed within a junction box 42 so as to be protected from the elements, animals, insects, etc.

In certain embodiments, a protected power system 16 may comprise a switch 44 and one or more electrical outlets 46. Accordingly, in a grid-down situation, one or more electrical devices (e.g., one or more critical electrical devices) may be selectively plugged in to the one or more outlets 46 and receive AC power from the inverter system 14. Alternatively or in addition to one or more electrical outlets 46, a protected power system 16 may include one or more hard wired connections (e.g., one or more permanent electrical connections or connections that may be made using a circuit breaker, blade switch, or the like) that connect one or more electrical devices, subpanels, or the like to an inverter system 14.

Certain wires 48 extending from an inverter system 14 to a protected power system 16 may be sized and configured to carry AC power from the inverter system 14 to the protected power system 16. Other wires 50 extending from an inverter system 14 to a protected power system 16 may enable a switch 44 of the protected power system 16 to control a flow of low voltage electricity from a transformer 34 to one or more components of an inverter system 14. Still other wires 52 extending from an inverter system 14 to a protected power system 16 may enable a switch 44 to control one or more functions of an inverter system 14 (e.g., enable a user to command or control certain functions of an inverter system 14 by manipulating the switch 44 in a particular manner).

Selected wires 54 may extend from an inverter system 14 to a meter 26 and/or main panel 26 that is connected to grid power via a power line 28. Accordingly, for safety reasons, electrical power may flow through those wires 54 only when a grid is up and functioning properly.

Figure 5:
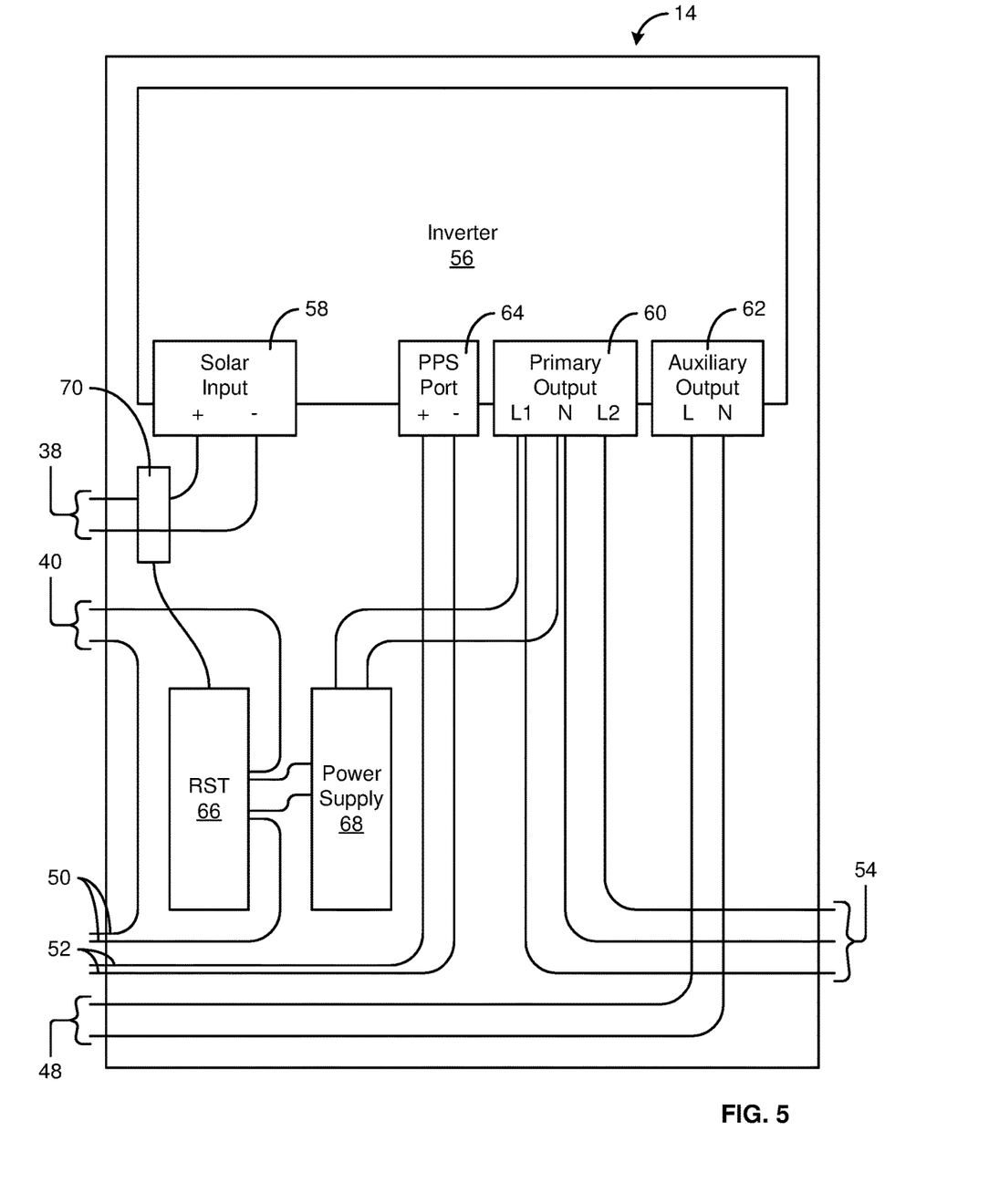
FIG. 5 is a schematic diagram of one embodiment of a connection arrangement for an inverter in accordance with the present invention.

Referring to FIG. 5, in selected embodiments, an inverter system 14 may comprise an inverter 56, one or more components of a rapid shutdown system, various wiring and/or wiring connections, and the like or a combination or sub-combination thereof. An inverter 56 may comprise a solar input 58, a primary output 60, an auxiliary output 62, and a protected power system port 64.

A solar input 58 may provide a location for a first set of wires 38 (e.g., wires 38 that carry relatively high voltage DC electrical power output by a solar array 12) to connect to an inverter 56. A primary output 60 may provide a location for wires 54 to connect to an inverter 56 and carry AC power to a meter 26 and/or main panel 26. An auxiliary output 62 may provide a location for wires 48 to connect an inverter 56 and carry AC power to a protected power system 16. A protected power system port 64 may provide a location for electrical inputs to be received by an inverter 56, which electrical inputs may be used to control the protected power functionality of the inverter 56.

Components of a rapid shutdown system that may be included as part of an inverter system 14 may be a rapid shutdown transmitter 66 and a power supply 68. A rapid shutdown transmitter 66 may include an induction ring 70. When a grid connected to an inverter 56 is up and running properly, a power supply 68 may receive AC power from the gird and/or the primary output 60, condition that power as desired or necessary (e.g., change the power from AC to DC), and supply the conditioned power to a rapid shutdown transmitter 66. Using the power provided by the power supply 68, a rapid shutdown transmitter 66 may energize the induction ring 70 and, thereby, superimpose a characteristic or identifiable signal within a circuit formed by the first set of wires 38. Because the one or more rapid shutdown modules 30 applied to the various solar panels 18 form part of the circuit formed by the first set of wires 38, they may sense or detect that signal. Accordingly, whenever the one or more rapid shutdown modules 30 can sense or detect the signal, the circuit may continue to pass electrical power from the solar array 12 to the solar input 58 of the inverter 56.

When the grid goes down, the inverter 56 may sense the grid down situation and stop sending AC power out through the primary output 60. This interruption of the grid and/or the supply of power to the primary outlet 60 may cut off the electrical power needed by a power supply 68. As a result, the rapid shutdown transmitter 66 may no longer have the power needed to superimpose a characteristic or identifiable signal within the circuit formed by the first set of wires 38. When the one or more rapid shutdown modules 30 are unable to sense or detect that signal, they may break the circuit and no more electrical power may pass from the solar array 12 to the solar input 58 of the inverter 56. Thus, within a very short time after a grid goes down, the flow of relatively high voltage DC electrical power from the solar array 12 to the inverter 56 may be stopped. This automatic process may be referred to as a "rapid shutdown."

Figure 6:
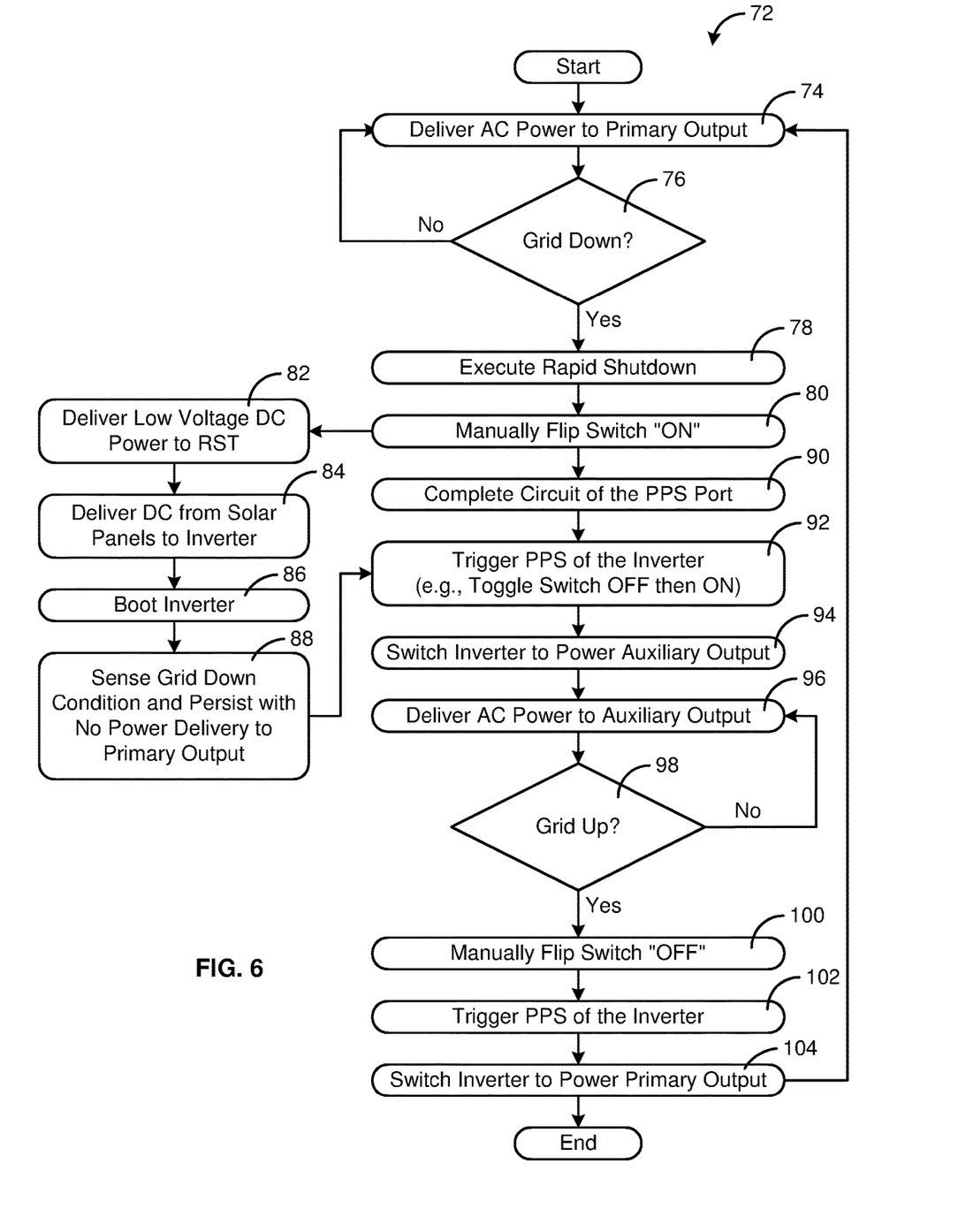
FIG. 6 is a block diagram of one embodiment of a method for operating a grid-tied solar power generation system in accordance with the present invention.

Referring to FIGS. 5 and 6, in selected embodiments, it may be desirable to obtain electrical power from a solar array 12 and inverter 56 when a grid is down. This electrical power may be used to power certain critical loads and may, therefore, be referred to as "protected power." An inverter 56 may be configured to support protected power functionality. Different inverters 56 may have different protected power functionality or require different procedures to set up or access protected power. Accordingly, while the specific connection scheme and process discussed below in connection with FIGS. 5 and 6 or selected portions or steps thereof may correspond to certain inverters 56 and not others, core principles or features thereof may be applicable to various inverters 56.

In certain embodiments, a method 72 in accordance with the present invention may begin with an inverter 56 delivering 74 AC power to a primary outlet 60. As long as there is sufficient sunlight and a grid connected to the primary output 60 is up and running properly, an inverter 56 may continue to deliver 74 AC power to the primary outlet 60. However, when the inverter 56 detects 76 a grid-down condition, a rapid shutdown may be initiated 78 or executed 78. As set forth above, a rapid shutdown may comprise stopping the delivery of AC power to a primary outlet 60, stopping the delivery of power to a rapid shutdown transmitter 66, stopping a superimposition of a characteristic or identifiable signal within the circuit of a solar array 12, and stopping a flow of electrical power from a solar array 12 to an inverter system 14. Accordingly, after rapid shutdown, no usable AC power may be output by an inverter 56.

With the grid down and no AC power available from an inverter 56, a user may choose to activate a protected power system 16. In selected embodiments, this may be accomplished by manually actuating 80 or flipping 80 a switch 44 of a protected power system 16 to an ON position. In certain embodiments, a switch 44 may be a double pole switch. Accordingly, flipping 80 the switch 44 to the ON position may independently complete or close two independent circuits.

A first circuit controlled by a switch 44 may electrically connect an output of a transformer 34 to a power input of a rapid shutdown transmitter 66. Accordingly, when the switch 44 is open, no electrical power may flow from the transformer 34 to the rapid shutdown transmitter 66. Conversely, when the switch 44 is closed, electrical power may flow from the transformer 34 to the rapid shutdown transmitter 66.

The electrical power output by a transformer 34 may be selected or configured to meet the power requirements of a rapid shutdown transmitter 66. Accordingly, with the switch 44 in an ON position, the rapid shutdown transmitter 34 may function as intended. That is, flipping 80 the switch 44 to an ON position may result in the delivery 82 of relatively low voltage DC power to the rapid shutdown transmitter 66, which power may enable the rapid shutdown transmitter 66 to superimpose a characteristic or identifiable signal within the circuit of a solar array 12. When one or more rapid shutdown modules 34 sense or detect the characteristic or identifiable signal, they may again deliver 84 a flow of electrical power from a solar array 12 to an inverter system 14. This power may be used to reboot 86 an inverter 56. However, as the inverter 56 boots up, it may sense 88 that the grid is still down and persist with no power delivery to the primary output 60.

A second circuit controlled by a switch 44 may electrically connect 90 at least two leads of (i.e., selectively complete 90 a circuit corresponding to) a protected power port 64 of an inverter 56. In selected embodiments, triggering 92 (e.g., transitioning the at least two leads of) a protected power port 64 between a disconnected and connected state in a particular manner or pattern may be interpreted by an inverter 56 as a command to initiate delivery of electrical power to an auxiliary output 62. For example, toggling a switch 44 to an OFF position, waiting about five seconds, and then toggling the switch 44 back to an ON position may be interpreted by an inverter 56 as a command to initiate delivery of electrical power to an auxiliary output 62. Accordingly, when a switch 44 is manipulated 92 or triggered 92 in that manner, an inverter 56 may switch 94 or transition to an auxiliary output 62 and deliver 96 AC power to the auxiliary output 62.

As long as there is sufficient sunlight, an inverter 56 may continue to deliver 96 AC power to the auxiliary outlet 60. However, when the grid is back up and running 98, it may be necessary or desirable to transition the inverter 56 back to the primary output 60 in order to receive the full benefit thereof (e.g., in order to access or receive the full capacity of the inverter 56). In selected embodiments, this transition may be accomplished by manually actuating 100 or flipping 100 a switch 44 of a protected power system 16 to an OFF position. For example, toggling 100 a switch 44 to an OFF position and leaving it there for at least about five seconds may disconnect one or more leads of protected power port 64 and, thereby, trigger 102 or instruct 102 an inverter 56 to initiate delivery of electrical power to the primary output 60. Accordingly, when a switch 44 is manipulated 100 in that manner, an inverter 56 may switch 104 or transition to the primary output 60 and deliver 74 AC power to the primary output 60.

Figure 7:
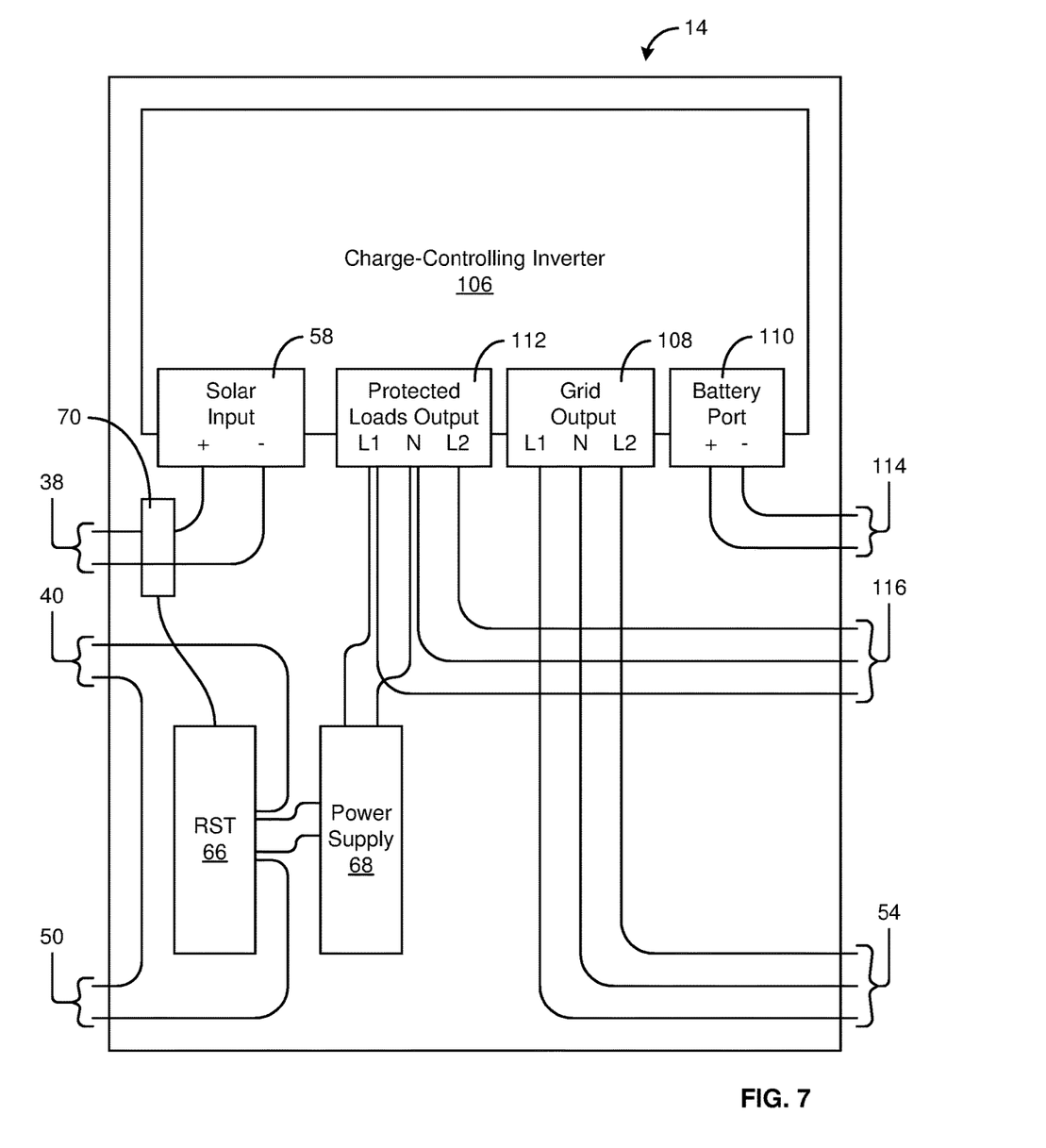
FIG. 7 is a schematic diagram of an alternative embodiment of a connection arrangement for an inverter in accordance with the present invention.

Referring to FIG. 7, in selected embodiments, an inverter system 14 may comprise a charge-controlling inverter 106 (i.e., an inverter 106 having charge controller functionality), one or more components of a rapid shutdown system, various wiring and/or wiring connections, and the like or a combination or sub-combination thereof. A charge-controlling inverter 106 may comprise a solar input 58, a grid output 108, a battery port 110, and a protected loads output 112.

A solar input 58 may provide a location for a first set of wires 38 (e.g., wires 38 that carry relatively high voltage DC electrical power output by a solar array 12) to connect to a charge-controlling inverter 106. A grid output 108 may provide a location for wires 54 to connect to a charge-controlling inverter 106 and carry AC power to a meter 26 and/or main panel 26. A battery port 110 may provide a location for wires 114 to connect a charge-controlling inverter 106 to a battery bank. Accordingly, electrical power may flow from a charge-controlling inverter 106, through a battery port 110, and to a battery bank or from a battery bank, through the battery port 110, and to the charge-controlling inverter 106. A protected loads output 112 may provide a location for wires 116 to connect to a charge-controlling inverter 106 and carry AC power to a protected loads panel (PLP). A protected loads panel may be a sub-panel wired to support certain electrical loads that are deemed to be of higher priority and are to preferentially receive electrical power in a grid-down situation.

A charge-controlling inverter 106 may be programmed or otherwise configured to enforce a hierarchy in the distribution of electrical power. The hierarchy may be different in different situations. For example, when a grid is up and running properly, a highest priority of a charge-controlling inverter 106 may be to ensure that a battery bank is fully charged. After a battery bank is being charged at a maximum rate or is fully charged, any additional power may be output from a charge-controlling inverter 106 via a grid output 108. However, in a grid-down situation, the hierarchy may be different. For example, when a grid is down, a highest priority of a charge-controlling inverter 106 may be to fully power a protected loads output 112. After a protected loads output 112 is fully supported, any additional power may be used, if needed, to charge a battery bank.

When a grid connected to a charge-controlling inverter 106 is up and running properly, a power supply 68 may receive AC power from the grid via a protected loads subpanel and the wires 116 that connect a protected load output 112 to the protected loads subpanel. When the grid goes down, a charge-controlling inverter 106 may sense the grid down situation, stop sending AC power out through the grid output 108, and start sending AC power out through the protected loads output 112. Accordingly, because the power supply 68 is connected to the protected loads output 112, it may receive the power it needs regardless of whether the grid is up or down.

However, in a situation (e.g., a nighttime grid-down situation) where a battery bank is depleted and there is insufficient sunlight to keep a charge-controlling inverter 106 running, the inverter 106 may turn off. In that situation, a power supply 68 may be unable to power a rapid shutdown transmitter 66. The rapid shutdown transmitter 66 may, therefore, no longer have the power needed to superimpose a characteristic or identifiable signal within the circuit formed by the first set of wires 38. When the one or more rapid shutdown modules 30 are unable to sense or detect that signal, they may break the circuit and no more electrical power may pass from the solar array 12 to the solar input 58 of the charge-controlling inverter 106. This break in the circuit may persist even when there is sufficient sunlight (e.g., the next morning) because with the battery bank depleted and the grid down there is no electricity to power the rapid shutdown transmitter 66.

Figure 8:
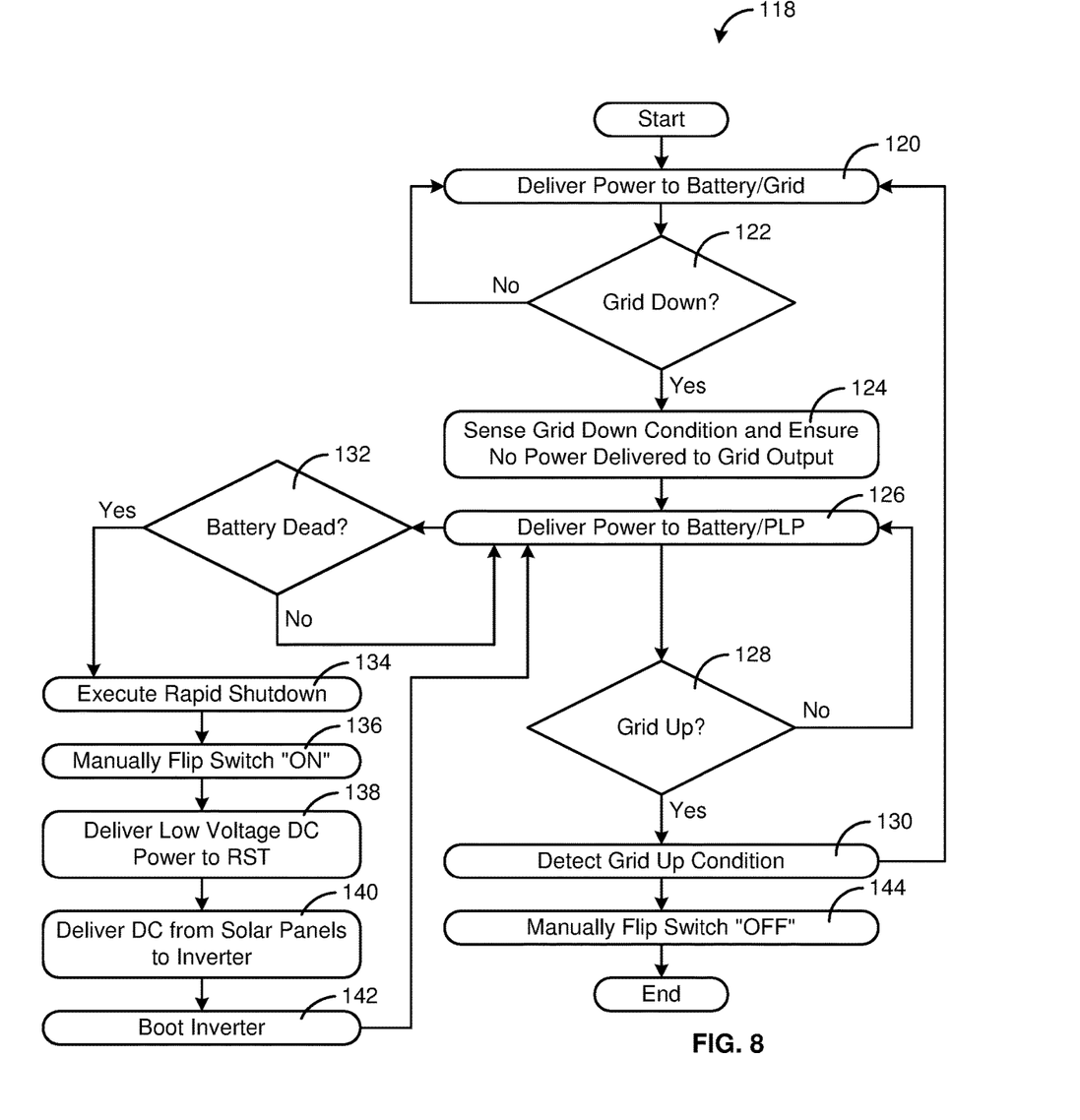
FIG. 8 is a block diagram of an alternative embodiment of a method for operating a grid-tied solar power generation system in accordance with the present invention.

Referring to FIGS. 7 and 8, it may be desirable to obtain electrical power from a solar array 12 to unlock or reset a rapid shutdown system in the grid-down-and-power-depleted situation described above. Accordingly, in certain embodiments, a method 118 in accordance with the present invention may begin with a charge-controlling inverter 106 delivering 120 AC power to a battery port 110 and/or grid output 108. As long as there is sufficient sunlight and a grid connected to the grid output 108 is up and running properly, a charge-controlling inverter 106 may continue to deliver 120 AC power to a battery port 110 and/or grid output 108. However, when the grid goes down 122, a charge-controlling inverter 106 may detect 124 the grid-down condition and ensure that no more power is delivered to the grid output 108. Thereafter, a charge-controlling inverter 106 may deliver 126 power to a protected loads output 112 and/or a battery port 110, pass power from a battery port 110 to a protected loads output 112, or the like.

As long as there is sufficient sunlight and a grid connected to the grid output 108 is down, a charge-controlling inverter 106 may continue to deliver 126 power to a protected loads output 112 and/or battery port 110. When the grid comes back up 128, a charge-controlling inverter 106 may detect 130 the grid-up condition and return to delivering 120 power to a battery port 110 and/or grid output 108. Alternatively, a charge-controlling inverter 106 may continue to deliver 126 power to a protected loads output 112 until a battery bank connected to a battery port 110 is completely depleted 130. Thereafter, a charge-controlling inverter 106 may power down and a rapid shutdown may be initiated 134 or executed 134. As set forth above, a rapid shutdown may comprise stopping the delivery of power to a rapid shutdown transmitter 66, stopping a superimposition of a characteristic or identifiable signal within the circuit of a solar array 12, and stopping a flow of electrical power from a solar array 12 to an inverter system 14.

With the grid down and a battery bank depleted, a user may choose to activate a protected power system 16. In selected embodiments, this may be accomplished by manually actuating 136 or flipping 136 a switch 44 of a protected power system 16 to an ON position. A circuit controlled by a switch 44 may electrically connect an output of a transformer 34 to a power input of a rapid shutdown transmitter 66. Accordingly, when the switch 44 is open, no electrical power may flow from the transformer 34 to the rapid shutdown transmitter 66. Conversely, when the switch 44 is closed, electrical power may flow from the transformer 34 to the rapid shutdown transmitter 66.

The electrical power output by a transformer 34 may be selected or configured to meet the power requirements of a rapid shutdown transmitter 66. Accordingly, with the switch 44 in an ON position, the rapid shutdown transmitter 34 may function as intended. That is, flipping 136 the switch 44 to an ON position may result in the delivery 138 of relatively low voltage DC power to the rapid shutdown transmitter 66, which power may enable the rapid shutdown transmitter 66 to superimpose a characteristic or identifiable signal within the circuit of a solar array 12. When one or more rapid shutdown modules 34 sense or detect the characteristic or identifiable signal, they may again deliver 140 a flow of electrical power from a solar array 12 to an inverter system 14. This power may be used to reboot 142 a charge-controlling inverter 106. However, as the charge-controlling inverter 106 boots up, it may sense that the grid is still down and persist with power delivery to a protected loads output 112 and/or a battery port 110 and no power delivery to a grid output 108.

Eventually, when the grid comes back up 128, a charge-controlling inverter 106 may detect 130 the grid-up condition and return to delivering 120 power to a battery port 110 and/or grid output 108. At that point, a user may manually actuate 144 or flip 144 a switch 44 to an OFF position.

The flowcharts in FIGS. 6 and 8 illustrate the architecture, functionality, and operation of possible implementations of systems and methods in accordance with the present invention. In this regard, each block in the flowcharts may represent a module, segment, or portion of code, which comprises one or more executable instructions for implementing the specified logical function(s). It will also be noted that each block and/or combinations of blocks may be implemented by special purpose hardware-based systems that perform the specified functions or acts, or combinations of special purpose hardware and computer instructions.

It should also be noted that, in some alternative implementations, the functions noted in the blocks may occur out of the order noted in the Figures. In certain embodiments, two blocks shown in succession may, in fact, be executed substantially concurrently, or the blocks may sometimes be executed in the reverse order, depending upon the functionality involved. Alternatively or in addition thereto, certain steps or functions may be omitted if not needed.

References in the specification to "one embodiment," "an embodiment," "an example embodiment," "selected embodiments," "certain embodiments," etc., indicate that the embodiment or embodiments described may include a particular feature, structure, or characteristic, but every embodiment may not necessarily include the particular feature, structure, or characteristic. Such phrases are not necessarily referring to the same embodiment.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A system comprising:
    an array of solar panels;
    an inverter;
    a rapid shutdown transmitter;
    first wiring extending to electrically connect the array of solar panels to the inverter;
    a transformer having an electrical input and an electrical output, the electrical input connected to receive electrical power from at least one solar panel of the array of solar panels;
    second wiring extending to electrically connect the electrical output of the transformer to the rapid shutdown transmitter; and
    a switch controlling delivery of electrical power through the second wiring from the electrical output of the transformer to the rapid shutdown transmitter.

2. The system of claim 1, wherein electrical power at a first voltage flows through the first wiring from the array of solar panels to the inverter.

3. The system of claim 2, wherein electrical power at a second voltage that is less than the first voltage is present at the output of the transformer.

4. The system of claim 3, wherein the first voltage is greater than thirty volts.

5. The system of claim 4, wherein the second voltage is about twelve to fourteen volts.

6. The system of claim 3, wherein each solar panel of the array of solar panels comprises a junction box and a rapid shutdown module.

7. The system of claim 6, wherein each solar panel of the array of solar panels is arranged such that electrical leads extend and pass electrical power from the junction box thereof to the rapid shutdown module thereof.

8. The system of claim 7, wherein the electrical inputs of the transformer receive electrical power from the electrical leads of the at least one solar panel.

9. The system of claim 8, wherein electrical power at a third voltage is present on the electrical leads of the at least one solar panel.

10. The system of claim 9, wherein the third voltage is less than the first voltage and greater than the second voltage.

11. A method comprising:
    obtaining a grid-tied solar system comprising
        an array of solar panels,
        an inverter,
        a rapid shutdown transmitter,
        first wiring extending to electrically connect the array of solar panels to the inverter,
        a transformer having an electrical input and an electrical output, the electrical input connected to receive electrical power from at least one solar panel of the array of solar panels,
        second wiring extending to electrically connect the electrical output of the transformer to the rapid shutdown transmitter, and
        a switch controlling delivery of electrical power through the second wiring from the electrical output of the transformer to the rapid shutdown transmitter;
    executing, in response to a grid-down condition in a grid connected to the grid-tied solar system, a rapid shutdown process in which a flow of electrical power through the first wiring from the array of solar panels to the inverter is shutdown;
    actuating the switch to power the rapid shutdown transmitter with electrical power output by the transformer; and
    passing, as a result of the powering of the rapid shutdown transmitter and while the grid continues in the grid-down condition, electrical power from the array of solar panels to the inverter through the first wiring.

12. The method of claim 11, wherein the inverter comprises a primary output and a auxiliary output.

13. The method of claim 12, wherein the executing comprises sensing, by the inverter, the grid-down condition and cutting off a delivery of alternating current to the primary output.

14. The method of claim 13, further comprising instructing, after the executing and while the grid continues in the grid-down condition, the inverter to deliver alternating current to the auxiliary output.

15. The method of claim 14, further comprising powering, during the passing and while the grid continues in the grid-down condition, one or more electrical devices with alternating current output by the inverter via the auxiliary output.

16. The method of claim 15, wherein the passing electrical power from the array of solar panels to the inverter through the first wiring comprises passing electrical power at a first voltage.

17. The method of claim 16, wherein powering the rapid shutdown transmitter with electrical power output by the transformer electrical comprises powering the rapid shutdown system transmitter with electrical power at a second voltage that is less than the first voltage.

18. The method of claim 17, wherein:
each solar panel of the array of solar panels comprises a junction box and a rapid shutdown module; and
each solar panel of the array of solar panels is arranged such that electrical leads extend and pass electrical power from the junction box thereof to the rapid shutdown module thereof.

19. The method of claim 18, wherein the electrical inputs of the transformer receive electrical power from the electrical leads of the at least one solar panel.

20. The method of claim 19, wherein:
electrical power at a third voltage is present on the electrical leads of the at least one solar panel; and
the third voltage is less than the first voltage and greater than the second voltage.

\* \* \* \* \*